United States Patent [19]
Williams et al.

[11] Patent Number: 5,867,731
[45] Date of Patent: Feb. 2, 1999

[54] SYSTEM FOR DATA TRANSFER ACROSS ASYNCHRONOUS INTERFACE

[75] Inventors: David P. Williams, Mounds View; Stephen Sutter, Osseo, both of Minn.

[73] Assignee: Unisys Corporation, Blue Bell, Pa.

[21] Appl. No.: 695,618

[22] Filed: Aug. 12, 1996

[51] Int. Cl.⁶ .................................................... G06F 11/27
[52] U.S. Cl. .................................... 395/849; 395/200.7
[58] Field of Search ................................... 395/849, 824, 395/734, 393, 733, 487, 183.04, 183.06, 183.21, 500, 200.7

[56] References Cited

U.S. PATENT DOCUMENTS

| | | | |
|---|---|---|---|
| 5,488,694 | 1/1996 | Mckee et al. | 395/824 |
| 5,566,324 | 10/1996 | Kass | 395/487 |
| 5,684,997 | 11/1997 | Kau et al. | 395/733 |

*Primary Examiner*—Robert W. Beausoliel, Jr.
*Assistant Examiner*—Pierre Eddy Elisca
*Attorney, Agent, or Firm*—Charles A. Johnson; Mark T. Starr; Johnson & Jacobson

[57] ABSTRACT

A system for use in transferring data packets across different clock domains using an input data register for receiving a block of data packets with the input data register and a plurality of interface registers located in the first clock domain for transferring a block of data packets from the input register to a second clock domain in response to a request signal with the system prioritizing the transfer of multiple data packets within the block of data packets by length in order to transfer the longer word packets first and the shorter word packets last with the shortest word packets within the block bundled together and simultaneously transferring across an asynchronous interface.

10 Claims, 3 Drawing Sheets

SYSTEM FOR DATA TRANSFER ACROSS ASYNCHRONOUS INTERFACE

FIELD OF THE INVENTION

This invention relates to data transfers between different clock domains without the use of buffers and more specifically, to use of multiple registers to transfer data between Input/Output processors in one clock domain and a cache in another clock domain.

BACKGROUND OF THE INVENTION

In certain applications, data from a plurality of Input/Output Processors (I/OPs) in a first clock domain is transferred to a Second Level Cache (SLC) in a second clock domain. The difference in data transfer rates because of the two different clock domains can cause slowdown in the data transfer. To handle the slowdown in data transfer, data buffers can be used to temporarily store the data giving the system time to catch up. While handling the temporary storage of data, the data buffers usually require numerous logic chips to provide the necessary data storage space.

In order to compensate for the different data transfer rates without storing the data in buffers, the present invention uses multiple registers to transfer data from a bridge at a rate fast enough to keep up with the transfer of data into the bridge.

The system prioritizes the transfer of data packets to ensure each of the input/output processors have equal access. With the present system, the data packets within a group of data packets are transferred by size with the longer data packets transferred from the bridge before the shorter data packets. After transfer of the longer data packets, the shortest data packets in the group of data packets are grouped together to fill the interface registers and are then transferred from the bridge to the cache during a single transfer cycle.

SUMMARY OF THE INVENTION

Briefly, the present invention includes a bridge with an input data register and multiple interface registers in one clock domain that can transfer data packets to a second clock domain. The use of multiple interface registers in the bridge permits transferring multiple data packets between different clock domains during a single transfer cycle to enable the bridge to keep up with the disparity of data transfer rates due to the difference in clock domains. The data packets transferred from the bridge are prioritized by size with the longer data packets being transferred first. The shortest data packets are the last to be transferred and the data packets from different I/OPs are grouped together until the interface registers are filled and then transferred from the bridge during a single transfer cycle thus allowing the data transfer into and out of the bridge at the same rate.

DESCRIPTION OF THE PREFERRED EMBODIMENT

Figure 1:
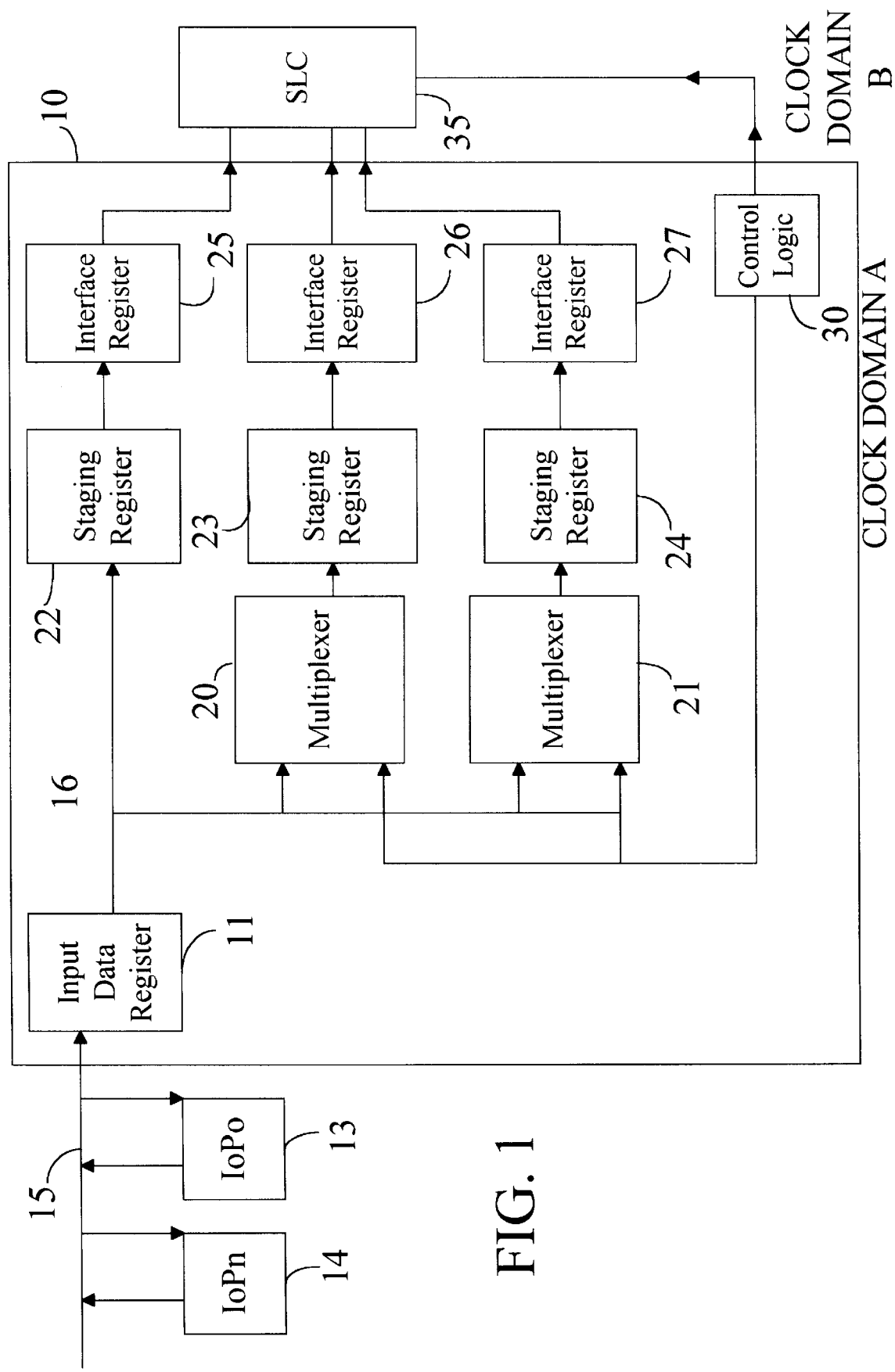
FIG. 1 shows a system for transfer of data packets from one clock domain to a second clock domain without the use of buffers.

FIG. 1 shows a logic chip 10 including a bridge 16 for transferring data packets between a set of input/output processors 13 and 14 to a cache 35 where the bridge and the cache are in different clock domains. The bridge 16 is part of an integrated logic chip 10 and includes an input data register 11 for receiving data packets from input/output processors 13 and 14 (I/OPs). Although only two input/output processors are shown, multiple input/output processors could be connected to bus 15 for transmitting data packets to cache 35. In the embodiment shown, bridge 16 is for use in transferring data packets of up to 10 words in length between input/output processors 13 and 14 and cache 35 without the use of a buffer and minimizing data backup even though the data transfer rates into and out of the bridge are different because the clock domain in the bridge and the clock domain in the cache are different.

A bus 15 connects to input/output processors 13 and 14 for sending data packets of up to 10 words in length to a two word wide input data register 11 in logic chip 10.

Located in the logic chip 10 is a two-word wide first staging register 22 for receiving a first two-word data packet from input data register 11, a two-word wide second staging register 23 for receiving a second two-word data packet from input data register 11, and a third two-word wide staging register for receiving a third two-word data packet from input data register 1. Located within chip 10 is a first control logic 30 and multiplexers 20 and 21 that direct the word packets from the input data register 11 to each of the various staging registers which are also two words wide. For example, if a six-word data packet is transferred to the input data register 11 from input/output processor 13, two of the first six words of the data packet are sent to staging register 22 where they are sent to interface register 25 to be held while waiting to be transferred to cache 35. The control logic 30 and multiplexers 20 and 21 direct the next two words of the six-word packet into staging register 23 where they are sent to interface register 26 to be held for transferring to cache 35. The control logic 30 and multiplexers 20 and 21 direct the remaining two words to staging register 24 where they are sent to interface register 27, and held for transferring to cache 35. Once the data packets in the staging registers are transferred to the interface registers, the three staging registers are able to receive additional data packets from the input data register 11 and the three interface registers remain in a ready condition to transfer the data packets to the cache 35 in response a request from control logic 30 to initiate a cache transfer cycle.

The interface register 25, 26 and 27 continue to hold the two-word data packets from staging register 22, 23 and 24 in a condition ready to be transferred until such time as control logic 30 enables cache 35 to receive the data packets from the three interface registers. That is, the cache 35 becomes responsive to receive each of the word packets in interface registers 25, 26 and 27 during a cache transfer cycle. Consequently, while data can be transferred into the interface register in the bridge at one rate, the use of three interface registers allows the transfer of multiple data packets from the bridge at substantially the same rate thus maintaining the uniform flow of data across the two clock domains.

Figure 2:
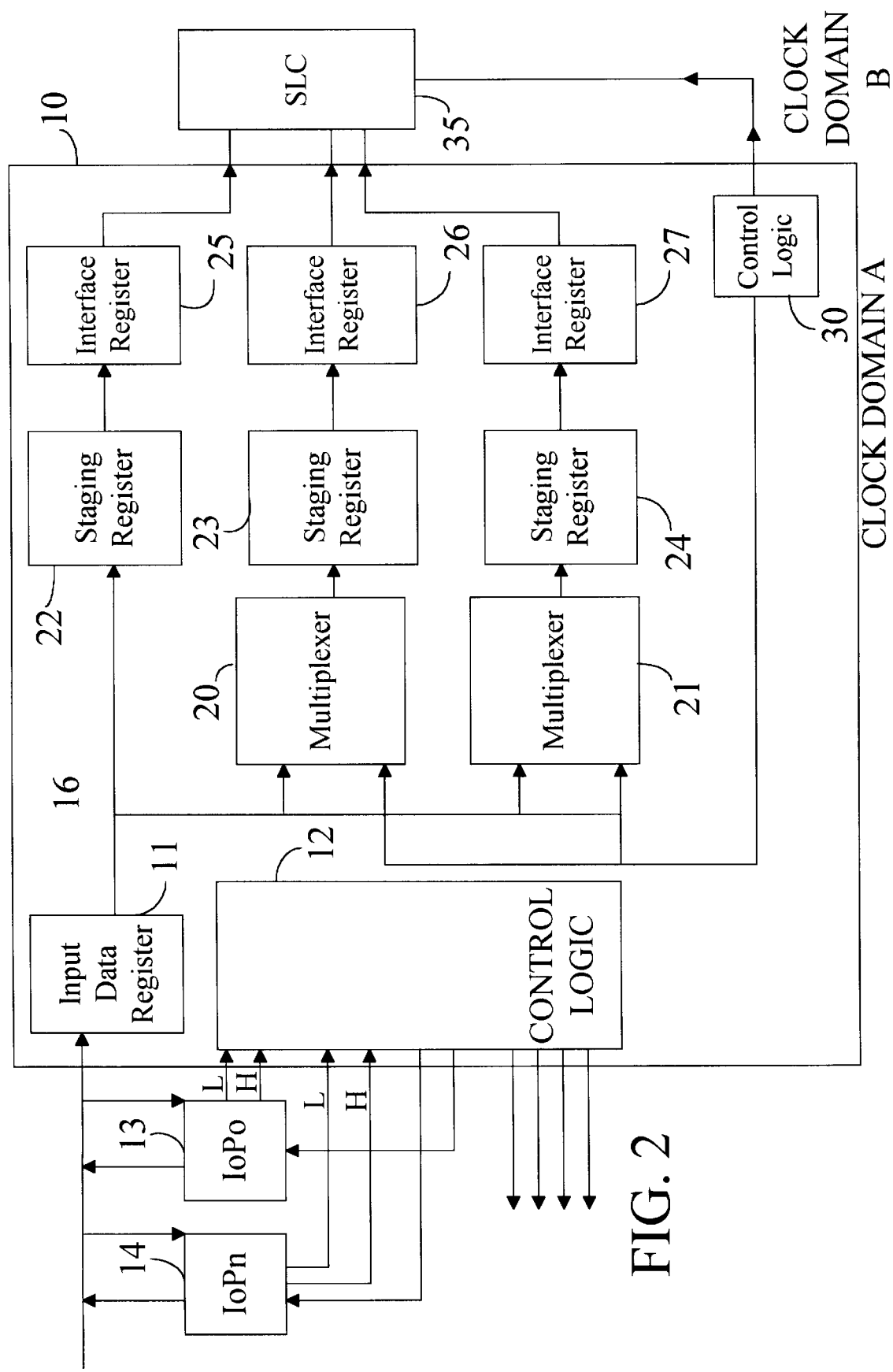
FIG. 2 shows the system of FIG. 1 with control logic for prioritizing the transfer of data packets of different length.

FIG. 2 shows the system of FIG. 1 with chip 10 including a second control logic 12 that enables one to prioritize the transfer of data packets from the input/output processors 13 and 14 to cache 35. Each of the input/output processors 13 and 14 have a low priority request line and a high priority request line, which are indicated by L and H. In operation of the system, control logic 12 enables requests for transfer of data packets from input/output processors 13 and 14 to input data register 11 in bridge 16. In the present invention, control logic 12 enables requests on the high priority lines to be given priority over requests on the low priority lines. The requests for data transfer on the low priority lines are prioritized and transferred according to length of the data packets with the longer data packets being transferred first.

The bridge 16 has control logic 12 to detect low priority requests, and as soon as a low priority request is detected, the bridge 16 takes a "snapshot" of all current low priority requests. After the "snapshot" is taken, the bridge 16 continues to detect new requests while continuing to transfer any requests in the current "snapshot" to cache 35. Thus, the bridge 16 guarantees equal access to the I/OPs by handling all requests in the first "snapshot" before taking a new "snapshot". As an I/OP can have only one outstanding request, the bridge 16 doesn't have to handle multiple request from the same I/OP. Once a request to an I/OP is granted, the I/OP transfers a data packet to the input data register 11. The data packets can be from two to ten words long. As the asynchronous interface between the bridge 16 and the cache 35 is only six words long, to maximize rate of transfer of data packets from the bridge 16 to the cache 35, the bridge 16 grants priority based on the length of the data packets.

In operation of the system of FIG. 2, the data packets from I/OPs 13 and 14 are transferred to input data register two words at a time. Control logic 12 takes a snapshot of the data packets in I/OPs 13 and 14, which are to be transferred to the input data register 11. In order to illustrate how multiple data packets of different length are transferred, FIG. 3 has been prepared assuming that there are six I/OPs transferring data to bridge 16.

Figure 3:
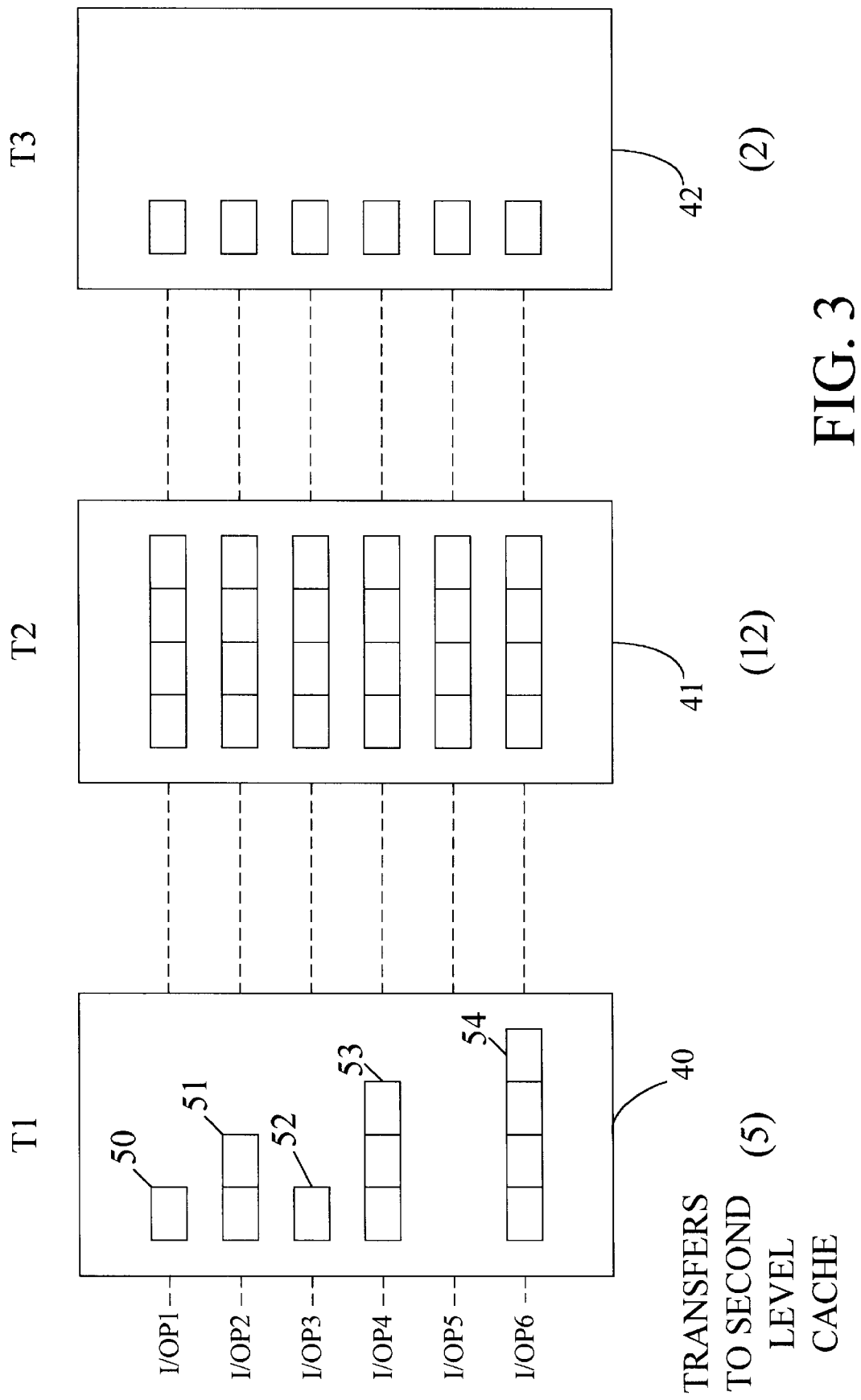
FIG. 3 shows examples of typical data packets that are transferred between the I/OPs and the bridge which are subsequently transferred to the Second Level Cache (SLC).

FIG. 3 illustrates a snapshot of data packets taken by control logic 12 at three different times $t_1$, $t_2$, and $t_3$. For purposes of showing how multiple data packets 50, 51, 52, 52 and 54 of various lengths are transferred to cache 35, reference should be made to FIG. 3, block 40, which illustrates the six different data packets from six input/output processors: $I/OP_1$, $I/OP_2$, $I/OP_3$, $I/OP_4$, $I/OP_5$ and $I/OP_6$. FIG. 3 shows that at time $t_1$ the length of each of the data packets from the 6I/OPs.

Table 1 shows the word length of the data packets from six input/output processors at a time $t_1$.

TABLE 1

DATA PACKETS WITHIN A BLOCK
OF DATA PACKETS AT TIME $t_1$

| Processor | Length of data packet |
| --- | --- |
| $I/OP_1$ | two words |
| $I/OP_2$ | four words |
| $I/OP_3$ | two words |
| $I/OP_4$ | six words |
| $I/OP_5$ | empty |
| $I/OP_6$ | eight words |

The bridge 16 continues to detect new requests while the data packets within snapshot 40 are transferred to cache 35.

While each of the 6 data packets from the I/OPs are transferred to bridge 16 at a maximum rate of two words per unit of time, the use of multiple interface registers in the present invention enables the data transfer from bridge 16 to cache 35 at a rate of up to six words per unit time thus enabling the transfer of the data to and from the bridge to remain in relative balance.

To complete the transfer of the 6 data packets in block 40 (snapshot at time $t_1$) from the bridge 16 to cache 35 takes five cache transfer cycles. That is, two transfer cycles to transfer the eight word data packet from $I/OP_6$ to cache 35. As $I/OP_5$ contains no data packets, no transfer cycle is required to transfer the information in $I/OP_5$. Next, the interface registers transfer the six-word packet in $I/OP_4$ with one transfer cycle by transferring two words of the six-word packet with each interface register 25, 26 and 27. After transferring the six-word packet in $I/OP_4$, the interface registers transfer the four-word data packet in $I/OP_2$ through interface registers 25 and 26, while interface register 27 remains open. To minimized the permutations and complexities of the system, the data packets of four or more words are not permitted to be transferred between the bridge 16 and the cache 35 during the same transfer cycle; however, the two-word packets from the input/output processors ($I/OP_1$ and $I/OP_3$) are permitted to be transferred to cache 35 in a single cache transfer cycle thus shortening the length of the transfer cycle at time $t_1$. That is, cache 35 needs to make itself available for only one transfer cycle to receive information from $I/OP_1$ and $I/OP_3$ thus shorting the number of data transfer cycles to cache 35.

To illustrate how word packets of longer length are transferred to and from bridge 16 reference should be made to FIG. 3, block 41, (snapshot at time $t_2$). Reference numeral 41 identifies a second block of data packets from the $I/OP_1$, $I/OP_2$, $I/OP_3$, $I/OP_4$, $I/OP_5$ and $I/OP_6$ which was taken at time $t_2$. Each of the data packets in block 41 is eight words long. Consequently, it takes 12 cache transfer cycles to transfer the data in block 41 to cache 35.

Table 2 shows the word length of the data packets from six input/output processors during a time $t_2$.

TABLE 2

DATA PACKETS WITHIN A BLOCK
OF DATA PACKETS AT TIME $t_2$

| Processor | Length of data packet |
| --- | --- |
| $I/OP_1$ | eight words |
| $I/OP_2$ | eight words |
| $I/OP_3$ | eight words |
| $I/OP_4$ | eight words |
| $I/OP_5$ | eight words |
| $I/OP_6$ | eight words |

Because the interface registers 25, 26 and 27 can only handle word packets of up to six words in length at a time, it takes two transfers to transfer each of the eight-word packets to cache 35 for a total of 12 data transfers cycles to transfer all the data in block 42 from bridge 16 to cache 35. In this mode, the number of transfer cycles is not reduced as it takes 12 transfers to complete the transfer of the data from block 41 to cache 35. It is with the shorter data packets that economies in transfer time between the bridge and the cache can be achieved as multiple two-word data packets can be transferred at one time.

To illustrate the time efficiency in transfer of multiple two-word packets, reference should be made to a third block 42, (snapshot at time $t_3$) from the $I/OP_1$, $I/OP_2$, $I/OP_3$, $I/OP_4$, $I/OP_5$ and $I/OP_6$ which shows each of the data packets in block 42 as two words long.

Table 3 shows in table form the word length of the data packets from six input/output processors at a time $t_3$.

TABLE 3

DATA PACKETS WITHIN A BLOCK
OF DATA PACKETS AT TIME $t_3$

| Processor | Length of data packet |
|---|---|
| $I/OP_1$ | two words |
| $I/OP_2$ | two words |
| $I/OP_3$ | two words |
| $I/OP_4$ | two words |
| $I/OP_5$ | two words |
| $I/OP_6$ | two words |

As the interface register 25, 25 and 27 can transfer three two-word packets from three different I/OPs during each transfer cycle, it take only 2 transfers to complete the transfer of the data packets at time $t_3$ to cache 35 whereas it would require 6 transfer cycles if the data packets from multiple I/OPs could not be sent at the same time. For example, following the procedure used with data packets of four words, each of the data packets from $I/OP_1$, $I/OP_2$, $I/OP_3$, $I/OP_4$, $I/OP_5$ and $I/OP_6$ would be transferred two words at a time to cache 35 which would require six transfer cycles between the bridge and the cache; however, the use of the three interface registers that permit transferring data packets from up to three different input/output processors at the same time allows up to six different data packets to be transferred in only two transfer cycles as each transfer cycle from the interface register transfers three two-word data packets.

With the system of the present invention, the bridge can handle the transfer of the six-word data packet from the bridge at substantially the same rate the data packets are transferred to the bridge. When the four-word packets are transferred, one of the interface registers is inactive and not transmitting data packets. In this condition, the bridge is transferring data out of the bridge at a slower rate than data is being transferred into the bridge. When this occurs, the bridge throttles back the transfer of data packets to avoid a data overrun condition. After handling the four-word data packets, up to three two-word data packets are sent across the asynchronous interface at the same time allowing the bridge to again maintain a transfer rate across the asynchrounus interface equal to that of the transfer rate into the bridge.

We claim:

1. A system for use in transferring data packets across different clock domains comprising:

an integrated logic chip;

an input data register in the logic chip for receiving a data packet with the input data register located in a first clock domain;

a first control logic in said chip for taking a snapshot of a block of data packets to be transferred to the input data register;

a second control logic for prioritizing the data packets in the block of data packets according to length; and a plurality of interface registers located in the first clock domain for transferring two or more data packets in the block of data packets from the input register to a second clock domain during a single transfer cycle.

2. The system of claim 1 including at least three interface registers.

3. The system of claim 2 wherein the interface registers are two words wide.

4. The system of claim 1 including a plurality of staging registers for transferring the data packets to the interface registers.

5. The system of claim 4 including a multiplexer for directing the data packets into the staging registers.

6. The system of claim 5 wherein the system transfers the longest data packets within the group of data packets before the shorter data packets are transferred.

7. The system of claim 5 wherein the interface registers simultaneously transfers the data packets of two words in length within the group of data packets into the second clock domain.

8. The method of transferring data packets across an asynchronous interface comprising:

taking a snapshot of data packets to select a block of data packets to be transferred from one clock domain to another clock domain; and prioritizing the transfer of data packets within the block of data packets by length and transferring the longer data packets across the asynchronous interface before transferring the shorter data packets and then simultaneously transferring the shortest data packet within the block of data packets across the asynchronous interface.

9. The method of claim 8 including the transfer of data packets ranging from two words to ten words in length.

10. A system for use in transferring data packets of various sizes between a plurality of input/output processors and an uplink without the use of a buffer and without causing a backup of the data packets where the rate of transfer of data to the input/output processors is less than the rate of transfer of data to the uplink comprising:

an integrated logic chip;

a first control logic in said chip;

a bus for sending data packets to the logic chip;

an input data register in the logic chip for receiving or transferring two word data packets at a time;

a plurality of input/output processors connected to said bus for sending data packets of up to 10 words to said input data register;

a first staging register for receiving two-word data packets from said input data register;

a second staging register for receiving two-word data packets from said input data register;

a third staging register for receiving two-word data packets from said input data register;

a first interface register for uplinking two-word data packets from said first staging register in response to a request signal from the control logic;

a second interface register for uplinking two-word data packets from said second staging register in response to a request;

a third interlace register for uplinking two-word data packets from said third staging register in response to a request signal from the control logic, whereby any two data packets in any of the interface register are simultaneously uplinked.

* * * * *